US005178936A

United States Patent [19]

Kamiya et al.

[11] Patent Number: 5,178,936

[45] Date of Patent: Jan. 12, 1993

[54] SUPPORT SHEET FOR PHOTOGRAPHIC PRINTING SHEET

[75] Inventors: Masahiro Kamiya; Tsunehisa Shigetani, both of Tokyo, Japan

[73] Assignee: Oji Paper Co., Ltd., Tokyo, Japan

[21] Appl. No.: 766,907

[22] Filed: Sep. 26, 1991

Related U.S. Application Data

[63] Continuation of Ser. No. 524,935, May 18, 1990, abandoned.

[30] Foreign Application Priority Data

May 23, 1989 [JP] Japan ................................ 1-127778

[51] Int. Cl.[5] ........................ B32B 7/02; B32B 27/10

[52] U.S. Cl. .................................. 428/218; 428/335; 428/342; 428/500; 428/511; 430/538

[58] Field of Search .............. 428/218, 335, 342, 500, 428/511; 430/538

[56] References Cited

U.S. PATENT DOCUMENTS 4,396,671 8/1983 Wanka et al. ...................... 428/323
4,452,846 6/1984 Akao ................................. 428/220
4,801,509 1/1989 Uno et al. .......................... 428/513

FOREIGN PATENT DOCUMENTS 0093049 6/1983 Japan .

OTHER PUBLICATIONS

Polyolefins: Structure and Properties by Herman V. Boenig, p. 55 (1966) Elsevier Publishing Company.

*Primary Examiner*—Paul J. Thibodeau
*Assistant Examiner*—D. S. Nakarani
*Attorney, Agent, or Firm*—Armstrong, Westerman, Hattori, McLeland & Naughton

[57] ABSTRACT

A support sheet for a photographic printing sheet, having a high resistance to scratching, curling and a enhanced ability to be sharply cut, and provided with front and back surface coating layers formed respectively on the front and back surfaces of a substrate sheet and comprising, as a main component, a polyolefin resin; the polyolefin resin in the front surface coating layer comprising 30 to 70% by weight of a linear low density ethylene-propylene or butene-1 copolymer (L-LDPE) having a density of 0.915–0.935 $g/cm^3$ and a melt index of 15–30 g/10 min and 30 to 70% by weight of a high pressure-processed low density polyethylene (HP-LDPE) having a density of 0.915–0.928 $g/cm^3$ and a melt index of 1 to 5 g/10 min.

5 Claims, No Drawings

SUPPORT SHEET FOR PHOTOGRAPHIC PRINTING SHEET

This application is a continuation of application Ser. No. 524,935 filed May 18, 1990, now abandoned.

BACKGROUND OF THE INVENTION

1) Field of the Invention

The present invention relates to a support sheet for a photographic printing sheet. More particularly, the present invention relates to a support sheet for a photographic printing sheet having a superior resistance to scratching and curling and an enhanced ability to be sharply cut.

2) Description of the Related Arts

A water-resistant resin-coated paper sheet consisting essentially of a substrate paper sheet coated on both surfaces thereof with a polyolefin resin is now used as a support sheet for a photographic printing sheet, in place of the former conventional baryta paper sheet, to cope with the current high speed developing treatment required for photographs.

In general, the support sheet for a photographic printing sheet must satisfy the requirements for a superior dimensional stability, resistance to humidity, adhesive activity and shielding activity, and must not affect the photographic emulsion layer formed thereon. Further, the support sheet must have a high resistance to curling and scratching and must be able to be sharply cut with a cutter or edge.

Usually, the support sheet for a photographic printing sheet is provided with a clear coating layer formed on one surface of a substrate sheet and composed of a clear polyolefin resin, and a opaque coating layer formed on the opposite surface of the substrate sheet and composed of an opaque mixture of an polyolefin resin with a pigment, for example, fine titanium dioxide particles. A photographic emulsion layer is formed on the opaque polyolefin resin coating layer (front surface layer).

Japanese Examined Patent Publication (Kokoku) No. 48-9963 (1973) discloses a support sheet for a photographic printing sheet, of the above-mentioned type. In this support sheet, a front surface coating layer on which the photographic emulsion layer is to be formed is provided by a high pressure-processed low density polyethylene resin (HP-LDPE), and a back surface coating layer is formed from a middle pressure-processed or low pressure-processed high density polyethylene resin alone or a mixture thereof with an HP-LDPE resin. In this type of support sheet, the density of the polyethylene resin in the front surface coating layer, on which the photographic emulsion layer is to be formed, in usually lower than that in the back surface coating layer, to prevent a curling of the photographic printing sheet made from the support sheet.

Also, in a photograph processing laboratory, images are printed on the photographic printing sheet through a negative film, developed to prepare a print with a positive image, and the resultant developed print sheet is cut to predetermined dimensions by a cutter or the like. When cut, the support sheet having the polyolefin resin coating layers or the photographic printing paper sheet or print sheet made from the above-mentioned support sheet is subjected to a shearing force created between upper and lower edges of the cutter. In this cutting procedure, the polyolefin resin coating layer is often stretched by the cutting force, and thus a sharply cut face thereof is not obtained. The support sheet, photographic printing sheet or print sheet having the above-mentioned stretched cutting face has an unsatisfactory appearance, and thus has a low commercial value.

Also, when the HP-LDPE resin is used, the resultant coating layer of the support sheet for a photographic printing sheet has a poor resistance to scratching. Namely, when the front surface coating layer comprising the HP-LDPE resin is brought into direct contact with guide rollers in a coating machine for coating thereon the photographic emulsion, or the back surface coating layer comprising the same polyethylene resin as mentioned above is brought into contact with a winding roller, those coating layer surfaces are often scratched, and the scratches formed on the front or back surface coating layer remain even after the photographic emulsion layer is formed on the front surface coating layer and the resultant photographic printing paper sheet is printed and developed, and therefore, the commercial value of the resultant print is lowered.

Recently, an attempt was made to enhance the resistance of the photographic printing paper to scratching by using a linear low density polyethylene resin (L-LDPE), as disclosed in Japanese Unexamined Patent Publication (Kokai) No. 2-73246 (1990). This type of photographic printing paper sheet does have an enhanced resistance to scratching and curling, but the photographic printing paper sheet cannot be satisfactorily sharply cut with a cutter or edge, and thus is not commercially viable.

Japanese Unexamined Patent Publication (Kokai) No. 63-301945 (1988) discloses a support sheet in which an L-LDPE resin is used to enhance the dispersion of titanium dioxide particles in the coating layer. The inventors of the present invention repeated this process and found that the enhancing effect of the L-LDPE resin on the titanium dioxide particles was not recognized and the resultant photographic printing paper sheet could not be satisfactorily sharply cut with a cutter. Also, it was recognized that any improvement in the dispersion is greatly influenced by the melt-flowing property of a resin to be used to dilute a master batch, as described in Japanese Unexamined Patent Publication (Kokai) No. 62-150248 (1987).

SUMMARY OF THE INVENTION

An object of he present invention is to provide a support sheet for a photographic printing sheet having a satisfactory resistance to curling and scratching and an enhanced ability to be sharply cut.

The above-mentioned object can be attained by the support sheet of the present invention for a photographic printing sheet, which comprises a substrate sheet; and front and back surface coating layers respectively formed on the front and back surfaces of the substrate sheet and composed of a resinous material comprising, as a principal component, a polyolefin resin; the polyolefin resin in the front surface coating layer comprising a mixture of 30 to 70% by weight of at least one linear low density polyethylene(L-LDPE ) copolymer of ethylene with an $\alpha$-olefin component consisting of at least one member selected from the group consisting of propylene and butene-1 and having a density of from 0.915 to 0.935 g/cm$^3$ and a melt index of 15 to 30 g/10 minutes, and 30 to 70% by weight of at least one HP-LDPE having a density of from 0.915 to 0.928 g/cm$^3$ and a melt index of 1 to 5 g/10 minutes.

DESCRIPTION OF THE PREFERRED EMBODIMENTS

The support sheet of the present invention for a photographic printing sheet comprises a substrate sheet, a front surface coating layer formed on the front surface of the substrate sheet, on which coating layer a photographic emulsion layer is formed, and a back surface coating layer formed on the back surface of the substrate sheet.

The substrate sheet usable for the present invention is not restricted to a specific type of sheet, and usually is selected from among paper sheets made from softwood pulp, hardwood pulp, and mixtures of the softwood and hardwood pulps. Also, the wood pulps are not limited to specific type of pulps made by specific pulping methods, but preferably are selected from among the kraft pulp, sulfite pulp, and soda pulp usually used for making paper sheets. Also, if necessary, a synthetic pulp and a blend pulp containing synthetic fibers can be employed for the substrate sheet of the present invention.

There is no restriction on the type, basis weight, and thickness of the substrate sheet, but preferably the substrate sheet has a high level of smoothness, enhanced by applying a compressive force to the substrate sheet by a calender or the like, and has a basis weight of from 50 to 250 g/m$^2$ and the thickness of 40 to 270 $\mu$m.

The paper sheets usable for the substrate sheet optionally contain at least one member selected from various paper additives, for example, dry paper strength reinforcers (for example, cationic starches, cationic polyacrylamides, and anionic polyacrylamides), sizing agents (for example, fatty acid salts, rosin, maleic acid-modified rosin, cationic sizing agents, and reactive sizing agents), fillers (for example, clay, talc, and kaolin), wet paper strength reinforcers (for example, melamine-formaldehyde resins and epoxidized polyamide resins), fixing agents (for example, aluminum sulfate and cationic starches), and pH-adjusting agents (for example, caustic soda and sodium carbonate). The paper sheet can be tub-sized or size-pressed by a treating liquid containing at least one member selected from water-soluble polymeric additives, sizing agents, inorganic electrolytes, hygroscopic substances, pigments, and pH-adjusting agents.

In the support sheet of the present invention, the front surface coating layer is composed of a polyolefin resin comprising 30 to 70% by weight of at least one specific linear low density polyethylene copolymer (L-LDPE) and 30 to 70% by weight of at least one specific high pressure-processed low density polyethylene (HP-LDPE).

The L-LDPE usable for the present invention is a copolymerization product of ethylene with an $\alpha$-olefin component consisting of at least one member selected from propylene and butene-1, and has a density of from 0.915 to 0.935 g/cm$^3$ and a melt flow index of 15 to 30 g/10 min.

If the $\alpha$-olefin component to be copolymerized with ethylene comprises an $\alpha$-olefin having 5 or more carbon atoms, for example, pentene-1, the resultant front surface layer in the support sheet can not be sharply cut.

The HP-LDPE has a density of from 0.915 to 0.928 g/cm$^3$ and a melt index of from 1 to 5 g/10 min.

If the content of the L-LDPE in the polyolefin resin for the front surface coating layer is more than 70% by weight, or the content of the HP-LDPE is less than 30% by weight, the resultant front surface coating layer does not have a satisfactory ability to be sharply cut with a cutter or edge.

If the content of the L-LDPE in the polyolefin resin is less than 30% by weight or the content of the HP-LDPE is more than 70% by weight, the resultant front surface coating layer exhibits an unsatisfactory resistance to scratching.

Also, if the L-LDPE has a melt index of less than 15 g/10 min and/or the HP-LDPE has a melt index of more than 5 g/10 min, the resultant front surface coating layer of the support sheet does not have a satisfactory ability to be sharply cut by a cutter or edge, and thus the resultant support sheet has a low commercial value.

Further, if the densities of the L-LDPE and HP-LDPE are respectively less than 0.915, the resultant front surface coating layer exhibits an unsatisfactory resistance to scratching.

Furthermore, if the density of the L-LDPE is more than 0.935 and the density of the HP-LDPE is more than 0.928, the resultant support sheet exhibits an unsatisfactory resistance to curling.

In the front surface coating layer of the present invention, the polyolefin resin optionally contains a small amount of an additional resin other than the L-LDPE and HP-LDPE, for example, 20% or less based on the total weight of the L-LDPE and HP-LDPE, unless the additional resin will make the density of the resultant polyolefin resin excessively high, whereby the resultant support sheet will exhibit a lower resistance to curling.

The L-LDPE usable for the present invention can be produced by a copolymerization of a monomeric mixture of ethylene with an $\alpha$-olefin component consisting of at least one member selected from propylene and butene-1 in the presence of a chromium type catalyst or a Zieglar type catalyst, by a low pressure-processed gas-phase polymerization method, slurry polymerization method, solution polymerization method or high pressure-processed bulk polymerization method. Preferably, the L-LDPE is produced by the low pressure-processed gas-phase polymerization method.

The amount of the comonomer selected from propylene and butene-1 to be copolymerized with ethylene is not limited to a specific value, as long as the resultant copolymer exhibits a predetermined density. Preferably, the comonomer is used in an amount of 1 to 10 molar %, to provided the copolymer.

The polyolefin resin for the back surface coating layer is not limited to a specific type of resin, and usually comprises at least one member selected from high density polyethylene resins, middle density polyethylene resins, low density polyethylene resins, polypropylene resins, and blends of two or more of the above-mentioned resins. As stated above, the density of the polyolefin resin for the back surface coating layer is preferably higher than that for the front surface coating layer.

In the support sheet of the present invention, the basis weights and thicknesses of the front and back surface coating layers are not critical. Namely, the thicknesses of the front and back surface coating layers may be the same as or different from each other. Usually, in consideration of the influence thereof on the resistance of the resultant support sheet to curling, and other properties, the thicknesses of the front and back surface coating layers are from 15 to 50 $\mu$m.

The front and back surface coating layers in the support sheet of the present invention optionally contain at least one additive selected from white pigments, for example, titanium dioxide, zinc oxide, talc, calcium carbonate, and aluminum hydroxide; fibrous fillers, for example, glass fibers, asbestos, and whiskers; coloring pigments, for example, carbon black, phthalocyanine type pigments, chrome yellow pigment, titanium yellow pigment, red oxide pigment, and ultramarine blue pigment; and stabilizers, anti-oxidants, anti-static agents, plasticizers, dispersing agents, lubricants, fluorescent pigments and dyes usually usable for polyolefin resins. The type, amount and method of mixing the additive to be added to the polyolefin resin can conform to the disclosures of U.S. Pat. Nos. 3,833,380, 4,169,188, 3,501,298, 3,449,257, and 3,499,762. Also, as disclosed in U.S. Pat. No. 3,884,692, the additive may be applied to the coating layer surface after the coating layer is formed on a surface of the substrate sheet. Further, as disclosed by U.S. Pat. Nos. 2,715,075, 2,846,727, 3,549,406 and 3,590,107, a surface-activating treatment is applied to the coating layer surface, if necessary.

In the support sheet of the present invention, the front and back surface coating layers can be formed on the substrate sheet by a melt-extrusion coating method.

Usually, the coating layers comprising a polyolefin resin material are formed on the substrate sheet by a melt-extrusion coating method in which a melt of the polyolefin resin material is spread on the substrate sheet surfaces while the substrate sheet is moved forward at a predetermined speed. Before the coating procedure, the surfaces of the substrate sheet are subjected to a corona discharge treatment or flame treatment, to activate the substrate sheet surfaces if necessary.

The front surface of the support sheet of the present invention to be coated with a photographic emulsion may be made a glossy surface, a matt surface or a satin-finish surface, depending on the intended use thereof. The surface of the back surface coating layer is usually a non-glossy surface.

Also, before applying a photographic emulsion, the surface of the front surface coating layer in the support sheet is preferably activated by the corona discharge treatment or flame treatment. If necessary, the back surface coating layer is also activated by the above-mentioned surface activating treatment.

EXAMPLES

The present invention will be further described in detail with reference to the following examples, that do not in any way limit the scope of the present invention.

In the examples and comparative examples, the resistance of the resultant support sheet for photographic printing paper to scratching and to curling, and the ability of the support sheet to be sharply cut, are evaluated in the following manner.

1. Resistance to scratching

Two support sheets for a photographic printing sheet are superposed one on the other in such a manner that a front surface of a support sheet, on which a photographic emulsion layer is formed, is brought into contact with a back surface of the other support sheet, and the resultant laminate is pressed under a load of 0.4 kg/cm$^2$ and at a temperature of 40° C., for 72 hours.

The glossiness of the front surface coating layer surface was measured at an angle of incidence of 60 degrees and at an angle of reflection of 60 degrees, before and after the above-mentioned scratching test.

The resistance of the front surface coating layer surface to scratching was represented by a difference between the glossiness thereof before and after the scratching test, and was evaluated and indicated in the following manner.

| Glossiness difference (G) before and after scratching test | Resistance to scratching | |
|---|---|---|
| | Evaluation | Indication (class) |
| $G < 2$ | Very good | A |
| $2 \leqq G < 4$ | Good | B |
| $4 \leqq G < 6$ | Not good | C |
| $G \geqq 6$ | Poor | D |

When the resistance to scratching is A class or B class, the resultant support sheet is adequate for practical use. 2. Resistance to curling A photographic printing paper sheet having a length of 10 cm and a width of 10 cm was left to stand for 16 hours in an atmosphere having a temperature of 20° C. and a relative humidity of 65%, to allow a spontaneous curling of the paper sheet. The curled paper sheet was then placed on a horizontal plate surface in such manner that the back face of the inwardly bent center portion of the paper sheet was brought into contact with the horizontal plate surface and the four corner portions of the paper sheet extended upward from the center portion. The average distance between the horizontal plate face and the top ends of the four corners was determined, and the resistance of the paper sheet to curling was evaluated and indicated in the following manner.

| Average distance (X) between horizontal plate face and four corner ends | Resistance to curling | |
|---|---|---|
| | Evaluation | Indication |
| $X < 1$ mm | Very good | A |
| 1 mm $\leqq X <$ 2 mm | Good | B |
| 2 mm $\leqq X <$ 4 mm | Not good | C |
| $X \geqq$ 4 mm | Poor | D |

When the resistance to curling is A class or B class, the resultant photographic printing sheet is adequate for practical use.

3. Ability to be sharply cut with a cutter or edge

A photographic printing paper sheet was cut by a guillotine type cutter, and the resultant cut face of the paper sheet was examined to evaluate the amount of stretching and deformation of the front surface coating layer of the paper sheet. The results of this evaluation are classified as follows.

| Class | Condition of cut face |
|---|---|
| A | Cut face was smooth and front surface coating layer was not deformed. |
| B | Front surface coating layer was locally and slightly deformed. |
| C | Front surface coating layer was stretched and deformed at substantially all portions thereof. |
| D | Front surface coating layer was greatly stretched and deformed at all portions thereof. |

When classified as A class or B class, the paper sheet is adequate for practical use.

EXAMPLES 1 TO 6 AND COMPARATIVE EXAMPLES 1 to 6

In each of Examples 1 to 6 and Comparative Examples 1 to 6, a fine paper having a basis weight of 170 $g/m^2$ was used as the substrate sheet. First, a corona discharge treatment was applied to the front and back surfaces of the substrate sheet, the front surface of the substrate sheet was then coated with a polyethylene resin having the composition as indicated in Table 1, and the back surface of the substrate sheet was coated with a blend resin consisting of 60 parts by weight of a high density polyethylene resin having a density of 0.958 $g/cm^3$ and a melt flow index of 20 g/10 min and 40 parts by weight of a HP-LDPE having a density of 0.924 $g/cm^2$ and a melt flow index of 4 g/10 min, each by a melt extrusion coating method.

The resultant front surface coating layer had a thickness of 30 μm and the back surface coating layer had a thickness of 27 μm.

The surface of the front surface coating layer was subjected to a corona discharge treatment, and then coated with a photographic emulsion for usual black-and-white photography (available under the trademark of Liquid Light from Rockland Colloid Co.) to provide a photographic printing paper sheet provided with a photographic emulsion layer having a thickness of 15 μm.

The resultant photographic printing paper sheet was subjected to the above-mentioned tests.

The results of the tests are shown in Table 1.

TABLE 1

| Example No. | Item | Composition of polyolefin resin for front surface coating layer: Titanium dioxide (part by wt.) | L-LDPE(*): Density (g/cm³) | L-LDPE(*): Melt flow index (g/10 min) | L-LDPE(*): Amount (part by wt.) | L-LDPE(*): Copolymerized α-olefin: Type | L-LDPE(*): Copolymerized α-olefin: Amount (mol %) | HP-LDPE: Density (g/cm³) | HP-LDPE: Melt flow index (g/10 min) | HP-LDPE: Amount (part by wt.) | Additional HDPE: Density (g/cm³) | Additional HDPE: Melt flow index (g/10 min) | Additional HDPE: Amount (part by wt.) | Property of support sheet: Resistance to scratch- (front surface) | Property of support sheet: Resistance to curling | Property of support sheet: Ability to be sharply cut |
|---|---|---|---|---|---|---|---|---|---|---|---|---|---|---|---|---|
| Example | 1 | 15 | 0.926 | 18 | 51 | Butene-1 | 3.4 | 0.919 | 2 | 34 | — | — | — | A | B | B |
| | 2 | 15 | 0.926 | 23 | 30 | Butene-1 | 3.6 | 0.919 | 2 | 55 | — | — | — | B | A | A |
| | 3 | 10 | 0.922 | 23 | 40 | Butene-1 | 4.3 | 0.919 | 2 | 40 | 0.958 | 20 | 10 | A | B | A |
| | 4 | 15 | 0.926 | 18 | 51 | Butene-1 | 3.4 | 0.918 | 4 | 34 | — | — | — | A | B | B |
| | 5 | 15 | 0.928 | 17 | 51 | Propylene | 7.0 | 0.919 | 2 | 34 | — | — | — | A | B | A |
| | 6 | 15 | 0.927 | 19 | 51 | Butene-1 | 1.2 | 0.919 | 2 | 34 | — | — | — | A | B | A |
| | | | | | | Propylene | 3.6 | | | | | | | | | |
| Comparative Example | 1 | 15 | 0.926 | 8 | 51 | Butene-1 | 3.1 | 0.919 | 2 | 34 | — | — | — | A | B | C |
| | 2 | 15 | 0.926 | 18 | 51 | Butene-1 | 3.4 | 0.918 | 8 | 34 | — | — | — | A | B | C |
| | 3 | 15 | 0.926 | 23 | 20 | Butene-1 | 3.6 | 0.919 | 2 | 65 | — | — | — | C | A | A |
| | 4 | 15 | 0.926 | 18 | 65 | Butene-1 | 3.4 | 0.919 | 2 | 20 | — | — | — | A | B | C |
| | 5 | 15 | 0.926 | 18 | 20 | Butene-1 | 3.4 | 0.919 | 2 | 20 | 0.951 | 9 | 45 | A | C | C |
| | 6 | 15 | 0.926 | 20 | 51 | Hexene 1 | 3.5 | 0.919 | 2 | 34 | — | — | — | A | B | C |

Note: (*)The L-LDPE was a copolymer of ethylene with the α-olefine or α-olefins as shown in Table 1 in the presence of a Ziegler catalyst and produced by a low pressure processed gas-phase polymerization method.

Table 1 clearly shows that the photographic printing paper sheets of Examples 1 to 6 each having a support sheet of the present invention have a satisfactory resistance to scratching and curling and an enhanced ability to be sharply cut with a cutter.

The photographic printing paper sheets of Comparative Examples 1 to 6 were unsatisfactory in one or more of the resistance to scratching and curling and the ability to be sharply cut.

Accordingly, as shown in Table 1, the support sheets of the present invention were useful for practical photographic printing sheets.

What is claimed is:

1. A support sheet for a photographic printing sheet comprising:

a substrate sheet, and front and back surface coating layers formed respectively on front and back surfaces of the substrate sheet and composed of a resinous material comprising, as a principal component, a polyolefin resin;

said polyolefin resin in the front surface coating layer comprising a mixture of 30 to 70% by weight of at least one linear low density polyethylene copolymer (L-LDPE) of ethylene with 1 to 10% molar % of at least one $\alpha$-olefin selected from the group consisting of propylene and butene-1 and having a density of from 0.915 to 0.935 g/cm$^3$ and a melt index of 15 to 30 g/10 minutes; and 30 to 70% by weight of at least one high pressure-processed low density polyethylene (HP-LDPE) having a density of from 0.915 to 0.928 g/cm$^3$ and a melt index of from 1 to 5 g/10 minutes;

and said polyolefin resin in the back surface coating layer having a higher density than that of the polyolefin resin in the front surface coating layer.

2. The support sheet as claimed in claim 1, wherein the substrate sheet consists of a paper sheet having a base weight of 50 to 250 g/m$^2$.

3. The support sheet as claimed in claim 1, wherein the linear low density polyethylene copolymer is prepared by a low pressure gas phase polymerization method.

4. The support sheet as claimed in claim 1, wherein the front and back surface coating layers respectively have a thickness of from 15 to 50 $\mu$m.

5. The support sheet as claimed in claim 1, wherein the polyolefin resin in the back surface coating layer is selected from the group consisting of high density polyethylene resins, middle density polyethylene resins, low density and blends of two or more of the above-mentioned resins.

* * * * *